(12) United States Patent  
Nagasawa

(10) Patent No.: US 8,780,795 B2  
(45) Date of Patent: Jul. 15, 2014

(54) WIRELESS COMMUNICATION APPARATUS AND CONTROL METHOD THEREOF

(75) Inventor: Chizuko Nagasawa, Yokohama (JP)

(73) Assignee: Kyocera Corporation, Kyoto (JP)

( * ) Notice: Subject to any disclaimer, the term of this patent is extended or adjusted under 35 U.S.C. 154(b) by 832 days.

(21) Appl. No.: 12/524,838

(22) PCT Filed: Jan. 29, 2008

(86) PCT No.: PCT/JP2008/051294  
§ 371 (c)(1),  
(2), (4) Date: Oct. 16, 2009

(87) PCT Pub. No.: WO2008/093671  
PCT Pub. Date: Aug. 7, 2008

(65) Prior Publication Data  
US 2010/0034144 A1    Feb. 11, 2010

(30) Foreign Application Priority Data

Jan. 30, 2007    (JP) .................................. 2007-019756

(51) Int. Cl.  
*H04W 4/00*    (2009.01)

(52) U.S. Cl.  
USPC .......................................... 370/328; 370/261

(58) Field of Classification Search  
USPC ................................ 370/328, 261  
See application file for complete search history.

(56) References Cited

U.S. PATENT DOCUMENTS 5,574,724 A * 11/1996 Bales et al. .................... 370/410  
6,810,035 B1 * 10/2004 Knuutila et al. ............... 370/354  
7,031,703 B1 * 4/2006 Graf et al. ..................... 455/432.1  
7,043,225 B1 * 5/2006 Patel et al. ..................... 455/405

(Continued)

FOREIGN PATENT DOCUMENTS

JP    2001-358834    12/2001  
JP    2004172907 A    6/2004

(Continued)

OTHER PUBLICATIONS

Japanese language office action dated Aug. 16, 2011 and its English language translation for corresponding Japanese application 2008556105.

(Continued)

*Primary Examiner* — Kenny Lin  
(74) *Attorney, Agent, or Firm* — DLA Piper LLP (US)

(57) ABSTRACT

A wireless communication apparatus capable of using a plurality of different wireless communication systems includes a receiving unit (110) for receiving an inquiry message inquiring whether possible to respond to a call establishing message to be transmitted later from a calling side by selecting a wireless communication system satisfying a condition desired by the calling side, a transmitting unit (110) for determining whether possible to respond to the call establishing message by selecting the wireless communication system satisfying the condition among the plurality of wireless communication systems (COM1, COM2 and COM3) based on the inquiry message received and for transmitting a response message indicating a result of the determination to the calling side, and a control unit (120) for controlling to respond to the call establishing message transmitted later by the calling side by selecting the wireless communication system based on the result of the determination.

9 Claims, 12 Drawing Sheets

(56) References Cited

U.S. PATENT DOCUMENTS

| | | | |
|---|---|---|---|
| 7,139,088 B2 * | 11/2006 | Murata et al. | 358/1.15 |
| 7,292,863 B2 | 11/2007 | Chen et al. | |
| 7,509,425 B1 * | 3/2009 | Rosenberg | 709/227 |
| 7,647,389 B2 * | 1/2010 | Jiang et al. | 709/220 |
| 7,756,546 B1 * | 7/2010 | Gupta | 455/552.1 |
| 2004/0148352 A1 * | 7/2004 | Menon et al. | 709/205 |
| 2004/0180689 A1 * | 9/2004 | Nayak | 455/552.1 |
| 2006/0264200 A1 * | 11/2006 | Laiho et al. | 455/410 |
| 2007/0053344 A1 * | 3/2007 | Liukkonen et al. | 370/352 |

FOREIGN PATENT DOCUMENTS

| | | |
|---|---|---|
| JP | 2005-229583 | 8/2005 |
| JP | 2006-186855 | 7/2006 |
| JP | 2006-311147 | 11/2006 |

OTHER PUBLICATIONS

Japanese language office action dated Jan. 10, 2012 and its English language translation issued in corresponding Japanese application 2008556105 cites the foreign patent document above.

* cited by examiner

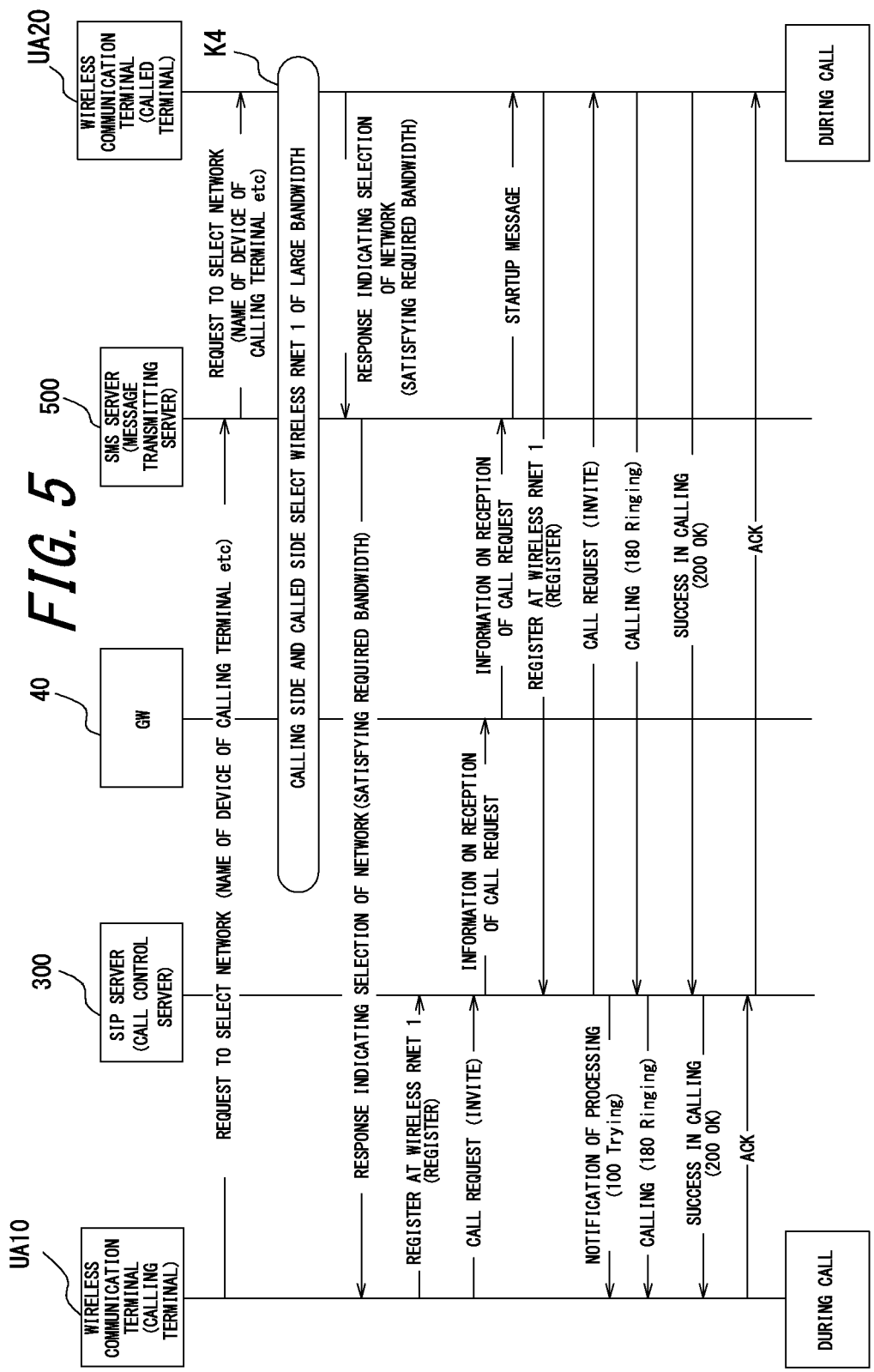

FIG. 6

(a)
```
Contact-Type:application/IP-TV-info+xml        <--NAME OF APPLICATION TO BE USED ???

Com-Media-Sel-Pref:bandwidth                   <--EXTENSIONS OF PREFERENCE ON SELECTION OF WIRELESS COMMUNICATION
                                                  MEDIA FOR CALLED SIDE Required:Com-Media-Sel-Pref;bandwidth;billing  <--NOTIFICATION OF EXTENSION HEADER AND OPTION TAG
Media-Name:IEEE802.16e                         <--WIRELESS COMMUNICATION MEDIA OF CALLING SIDE
Media-Name:EV-DO
Media-Name:CDMA-1X
Required:media-Name;IEEE802.16e;EV-DO;CDMA-1X;WLAN   <--DESCRIPTION OF BANDWIDTH SPECIFYING APPLICATION
b="AS:500"
```

(b)
```
Com-Media-Sel-Pref-Result:EV-DO:               <--RESULT OF SELECTION OF WIRELESS COMMUNICATION
                                                  MEDIUM BY CALLED SIDE
Required:Com-Media-Sel-Pref-Result;IEEE.802.16e;CDMA1X;EV-DO;WLAN   <--NOTIFICATION OF EXTENSION HEADER AND OPTION TAG
Required:Com-Media-Sel-Pref-Result;IEEE.802.16e;CDMA1X;EV-DO;WLAN   <--NOTIFICATION OF EXTENSION HEADER AND OPTION TAG
Media-Name:EV-DO                               <--WIRELESS COMMUNICATION MEDIA OF CALLING SIDE
Media-Name:CDMA-1X
Required:Media-Name;IEEE802.16e;EV-DO;CDMA-1X;WLAN
```

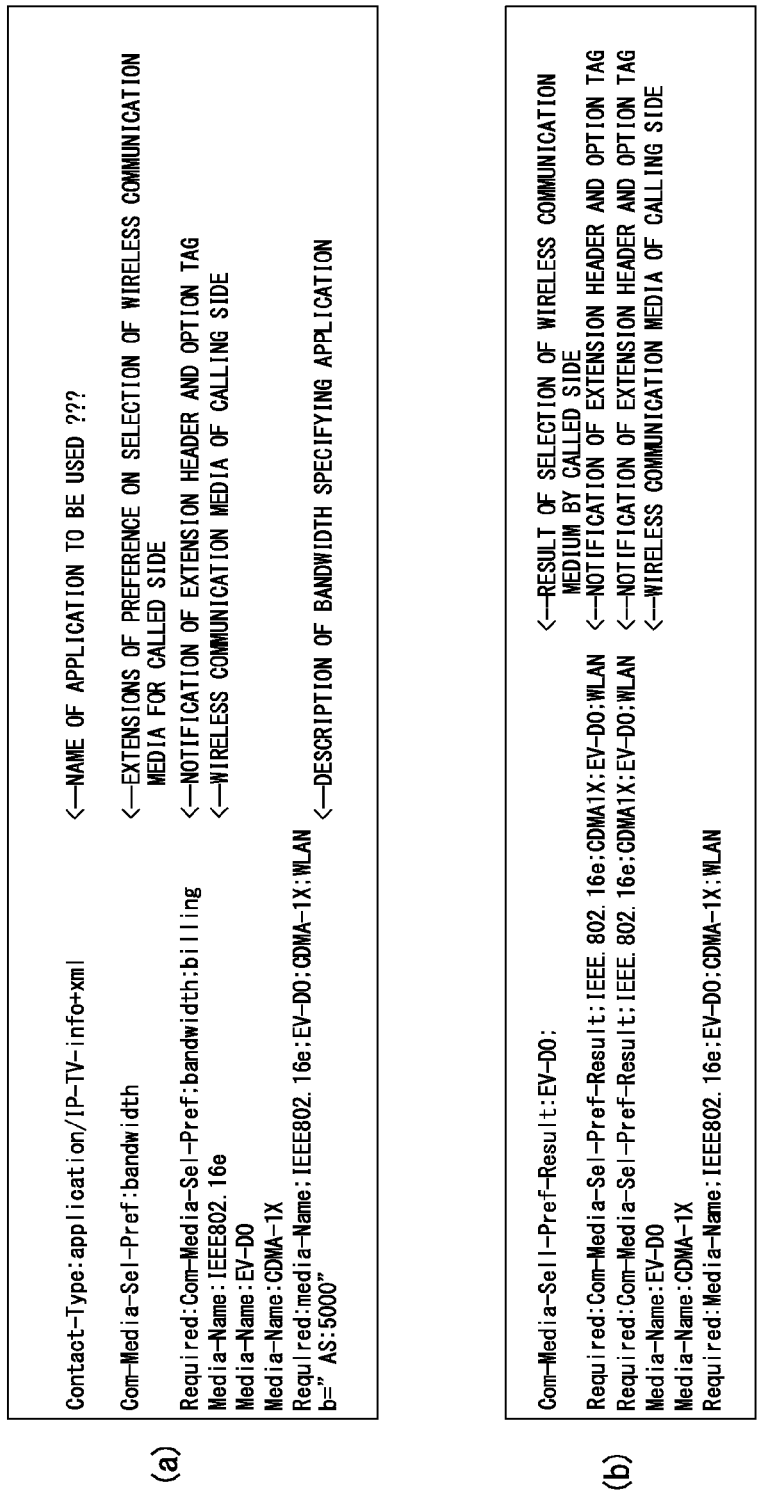

US 8,780,795 B2

WIRELESS COMMUNICATION APPARATUS AND CONTROL METHOD THEREOF

CROSS-REFERENCE TO THE RELATED APPLICATIONS

This application is a national stage of international application No. PCT/JP2008/051294 filed on Jan. 29, 2008, which also claims the benefit of priority under 35 U.S.C. §119 to Japanese Patent Application No. 2007-019756 filed on Jan. 30, 2007, the entire contents of which are incorporated herein by reference.

TECHNICAL FIELD

The present invention relates to a wireless communication apparatus and a control method thereof.

BACKGROUND ART

SIP (Session Initiation Protocol) is a standard set as one of call control protocols achieving call control such as connection request with a realtime application of an internet phone based on VoIP (Voice over Internet Protocol). (For example, see Non-Patent Document 1.)

SIP was used originally for VoIP communication between computers such as personal computers and servers connected via a wired network on the internet. In recent years, however, a SIP server and a wireless communication terminal (apparatus) of wireless carriers (operators) supporting SIP has been developed, as digitalization of and adoption of IP technology to a wireless communication equipment has been enhanced. Furthermore, the recent development of wireless communication technology enables a single wireless communication terminal to be provided with a plurality of wireless communication devices connectable to different wireless communication networks. Typical constitutions are PDA, PC or a cellular phone provided with a first wireless communication device to connect to a cellular phone network and a second wireless communication device to connect to a station of a wireless LAN such as WiFi and WiMAX, or MAN (Metropolitan Area Network).

Non-Patent Document 1: the website at http://www.ietf.org/rfc/rfc3261.txt (a document of RFC defining SIP)

SUMMARY OF INVENTION

Technical Problem

The SIP technology, however, was originally intended for use in a wired communication network, not in a wireless communication network in which a bandwidth and communication quality change momentarily. Moreover, the SIP technology was not intended for use in the wireless communication apparatus connectable to a plurality of wireless communication networks. That is, the SIP technology in the wired communication network on the internet has been developed, while underdeveloped has been the SIP technology premising on communication environments across a plurality of different kinds of wireless networks.

FIG. 12 shows a configuration diagram of a wireless communication network of the conventional art. As shown in the figure, serving as a server or a gateway are a DNS server 10, a SIP server 20, a SIP server 30, a gateway (GW) 40, an SMS server 50, a SIP server (or GW) 60, and a SIP server (or GW) 70. A wireless communication terminal UA1 (wireless communication terminal #A), a wireless communication terminal UA2 (wireless communication terminal #B), and a communication terminal (softphone) UA3 serve as a communication terminal or the softphone of a calling side or a called side. Each terminal is connected to each server stated above via the internet NET1, an operator packet network NET2, an operator circuit switching network NET3, and operator wireless communication packet networks RNET1 and RNET2.

In the constitution of the wireless communication network of the conventional art shown in FIG. 12, for example, when the wireless communication terminal UA2 is called (receives an instruction for connection to the packet network and registration operation) by an SMS (Short Message Service) message from the SMS server 50 of the circuit switching network corresponding to the operator wireless communication packet network RNET1 in response to a SIP connection request (calling: Invite) by the wireless communication terminal UA1, the wireless communication terminal UA2 performs a registration operation of SIP (Session Initiation Protocol) to the SIP server 30 via the packet switching network (in this case, RNET1) of the wireless communication network corresponding to the called circuit switching network (that is, provided by the same carrier), and establish a call by performing SIP procedures thereafter. This method is on the premise of the wireless communication terminal usable only a single operator wireless communication packet network and the circuit switching network corresponding thereto. When the wireless communication terminal UA2, on the other hand, has a function to connect to two operator wireless communication packet networks RNET1 and RNET2 and thus has two options, the conventional art of SIP (that is, the wireless communication terminal UA2 having SIP therein) registers SIP via the network (the operator wireless communication packet network RNET1 in this example) corresponding to a path through which a message passed including a connection request (instruction for connection to the packet network and registration) as described above, and establish a session with the caller/calling side (calling party) by use of the path of the packet network. In such a method for establishing the session, it does not always reflect a wish and a priority with regard to the bandwidth corresponding to the application which the calling side user (calling party) desires to use or a preference of the calling side user such as billing. That is, the preference of the user (calling party) requesting connection is not considered at all.

Even if the calling side passes on the preference (condition) desired by the calling side to the called side when calling with the call establishing message (INVITE) of SIP and the called side may select the wireless communication system which corresponds to the condition as much as possible, the calling side is incapable of knowing the wireless communication system selected by the called side before start of the session. In other words, the terminal of the calling side can know which wireless communication network the terminal of the called side is connectable (which bandwidth the called side may use) or which wireless communication network is selected by the called side, only after establishment of the session. It is thus not possible before establishment of the session for the calling side to know whether the terminal of the called side satisfies the preference informed by the calling side or to what degree the called side satisfies the preference if satisfying the preference. For example, when the terminal of the called side is connectable only to the wireless communication network with a bandwidth not satisfying the required bandwidth, the terminal of the calling side cannot start the communication with optimum bandwidth and wireless communication network in consideration of the current wireless communication condition of the terminal of the called side.

For example, when the calling side is connectable to WiMAX (broadband) and EVDO (narrowband) while the called side is connectable only to EVDO (narrowband), and the calling side selects WiMAX prioritizing the bandwidth over billing and calls the called side, the called side can connect only to EVDO regardless of the notified the condition prioritizing the bandwidth. In such a case, therefore, regardless of the use of broadband WiMAX by the calling side, the narrowband EVDO selected by the called side causes a bottleneck, leading to waste of the bandwidth of WiMAX occupied and consumed by the calling side because only the bandwidth of EVDO can be used in the session. It is thus an inefficient usage of bandwidth and waste of power. The wireless communication apparatus, in particular, is often carried constantly changing its wireless communication condition. For connection between the wireless communication apparatuses in such constantly changing environments of radio wave propagation, a need exists for a development of technology that provides the wireless communication connection efficient for both the called side and the calling side by selecting optimum wireless communication systems corresponding to the wireless communication conditions of both parties. There has thus been a problem that the wireless communication terminal of the caller/calling side (calling party) cannot efficiently use a plurality of connectable wireless communication systems (paths, networks and communication devices).

It is thus an object of the present invention to provide a technique (apparatus and method) to establish a wireless session between the calling side and the called side from the beginning by selecting an optimum wireless communication system for both sides by enabling the called side to select the wireless communication system corresponding to the condition desired by the calling side and the calling side to select the optimum wireless communication system as well in consideration of the called side based on the condition of the wireless communication system to which the called side is connectable, when the wireless communication terminal of the called side has a plurality of wireless communication systems (devices/paths, networks and bandwidths) as options.

Solution to Problem

In order to solve the problems above, a wireless communication apparatus (called side: called party) capable of using a plurality of different wireless communication systems in accordance of the present invention, includes:

a receiving unit for receiving an inquiry message inquiring whether possible to respond to a call establishing message (INVITE of SIP, for example) to be transmitted later from a calling side (a calling station/terminal: calling side) by selecting a wireless communication system satisfying a condition (preference information) desired by the calling side;

a transmitting unit for determining whether possible to respond to the call establishing message by selecting a wireless communication system satisfying the condition among the plurality of wireless communication systems based on the inquiry message received and for transmitting a response message indicating a result of the determination to the calling side; and a control unit for controlling to respond to the call establishing message to be transmitted later from the calling side, by selecting a wireless communication system based on the result of the determination.

In the wireless communication apparatus in accordance with one embodiment of the present invention, the transmitting unit transmits a respondable condition to the calling side as the result of the determination to the call establishing message to be transmitted later from the calling side when a wireless communication system satisfying the condition cannot be selected.

In the wireless communication apparatus in accordance with one embodiment of the present invention, the respondable condition is information (for example, a wireless communication standard, a bandwidth, the name of the wireless communication device or the like) indicating a wireless communication system selected for its own terminal to respond to the call establishing message to be transmitted later from the calling side.

It is preferable to provide a relay server (for example, a SIP server or an SMS server to transmit a calling message based on the call establishing message) between the calling side and the wireless communication apparatus for converting the call establishing message (INVITE) into the calling message (SMS, Paging and the likes) and transmitting the calling message.

In addition, the wireless communication apparatus (calling side: calling party) capable of using a plurality of different wireless communication system in accordance with one embodiment of the present invention, includes:

a first transmitting unit for transmitting a call establishing message (for example, INVITE of SIP) to a called side (a station/terminal of a called side: called party);

a second transmitting unit for transmitting an inquiry message inquiring whether possible to respond to the call establishing message by selecting a wireless communication system satisfying a condition (preference information) desired by its own apparatus (calling side) to the called side when the called side responds to the call establishing message, prior to transmission of the call establishing message by the first transmitting unit (when the first transmitting unit accepts transmission of the call establishing message or before a command to transmit is given to the first transmitting unit);

a receiving unit for receiving a response message, from the called side, indicating whether possible to respond to the call establishing message by selecting a wireless communication system satisfying the condition based on the inquiry message transmitted from the second transmitting unit; and a control unit for controlling the first transmitting unit to select one wireless communication system among the plurality of wireless communication systems based on the response message received and to transmit the call establishing message to the called side.

In the wireless communication apparatus in accordance with one embodiment of the present invention, when a response message (response to follow the condition) indicating that it is possible to respond by connecting to the wireless communication system satisfying the condition is received from the called side, the control unit controls the first transmitting unit to select one wireless communication system (for example, desired network device, bandwidth or the like) satisfying the desired condition among the plurality of wireless communication systems and to transmit the call establishing message to the called side based on the response message.

In the wireless communication apparatus in accordance with one embodiment of the present invention, when a response message (response not to follow the condition) indicating that it is possible to respond by connecting to a wireless communication system not satisfying the condition is received from the called side, the control unit controls the first transmitting unit to select one wireless communication system among the plurality of wireless communication systems based on the response message and to transmit the call establishing message to the called side.

Although taking forms of apparatuses in the above description, the present invention may also be implemented as a method, a program and a recording medium storing a program that substantially correspond to the apparatuses. Therefore it will be understood that such modification and variation are considered to be within the scope of the present invention.

For example, another embodiment of the present invention implementing the present invention as a method is a controll method of a wireless communication apparatus (called side: called party) capable of using a plurality of different wireless communication systems includes the steps of:

receiving the inquiry message inquiring whether possible to respond to a call establishing message (INVITE of SIP, for example) to be transmitted later from the calling side (a calling station/terminal: calling party) by selecting a wireless communication system satisfying the condition (preference information) desired by the calling side;

determining whether possible to respond to the call establishing message by selecting a wireless communication system satisfying the condition among the plurality of different wireless communication systems based on the inquiry message received and transmitting a response message indicating a result of the determination to the calling side; and controlling to respond to the call establishing message transmitted later from the calling side by selecting a wireless communication system based on the result of the determination.

A control method of a wireless communication apparatus (calling side: calling party) capable of using a plurality of different wireless communication systems in accordance with one embodiment of the present invention, includes the steps of:

transmitting an inquiry message inquiring whether possible to respond to a call establishing message by selecting a wireless communication system satisfying a condition (preference information) desired by a calling side to a called side when the called side responds to the call establishing message, prior to transmission of the call establishing message to the called side;

receiving a response message from the called side indicating whether possible to respond to the call establishing message by selecting a wireless communication system satisfying the condition based on the inquiry message transmitted; and controlling to transmit the call establishing message to the called side by selecting one wireless communication system among the plurality of wireless communication systems based on the response message received.

A control method of a wireless communication apparatuses of a calling side and a called side capable of using a plurality of different wireless communication systems in accordance with one embodiment of the present invention, includes:

a first transmitting step for the wireless communication apparatus of the calling side to transmit an inquiry message inquiring whether possible to respond to a call establishing message by selecting a wireless communication system satisfying a condition desired by the calling side to the called side when the called side responds to the call establishing message, prior to transmission of the call establishing message to the called side;

a first receiving step for the wireless communication apparatus of the called side to receive the inquiry message from the wireless communication apparatus of the calling side;

a second transmitting step for the wireless communication apparatus of the called side to determine whether possible to respond to the call establishing message by selecting a wireless communication system satisfying the condition among the plurality of wireless communication systems based on the inquiry message received, and to transmit a response message indicating a result of the determination to the calling side;

a second receiving step for the wireless communication apparatus of the calling side to receive the response message transmitted in the second transmitting step from the called side;

a first control step for the wireless communication apparatus of the calling side to control to select one wireless communication system among the plurality of wireless communication systems based on the response message received and to transmit the call establishing message to the called side; and a second control step for the wireless communication apparatus of the called side to control to respond to the call establishing message transmitted from the calling side by selecting the wireless communication system based on the result of the determination.

According to the present invention, it is possible to start an efficient communication session corresponding to wireless communication conditions of both calling side and called side in consideration of the wireless communication systems (wireless communication devices, networks and bandwidths) of both sides. For example, since the wireless communication system optimum for both sides may be used from the beginning, it is prevented for the calling side to use the application of the bandwidth over that of the wireless communication system of the called side.

BRIEF DESCRIPTION OF DRAWINGS

FIG. 5 is still another sequence diagram illustrating communication between the wireless communication terminals having the same operator (wireless carrier);

FIG. 6 shows exemplary formats of an inquiry message and a response message supported by communication apparatuses such as the wireless communication terminals and SIP servers in accordance with the present invention;

FIG. 7 shows other exemplary formats of the inquiry message and the response message supported by communication apparatuses such as the wireless communication terminals and the SIP servers in accordance with the present invention;

DESCRIPTION OF EMBODIMENTS

Figure 1:
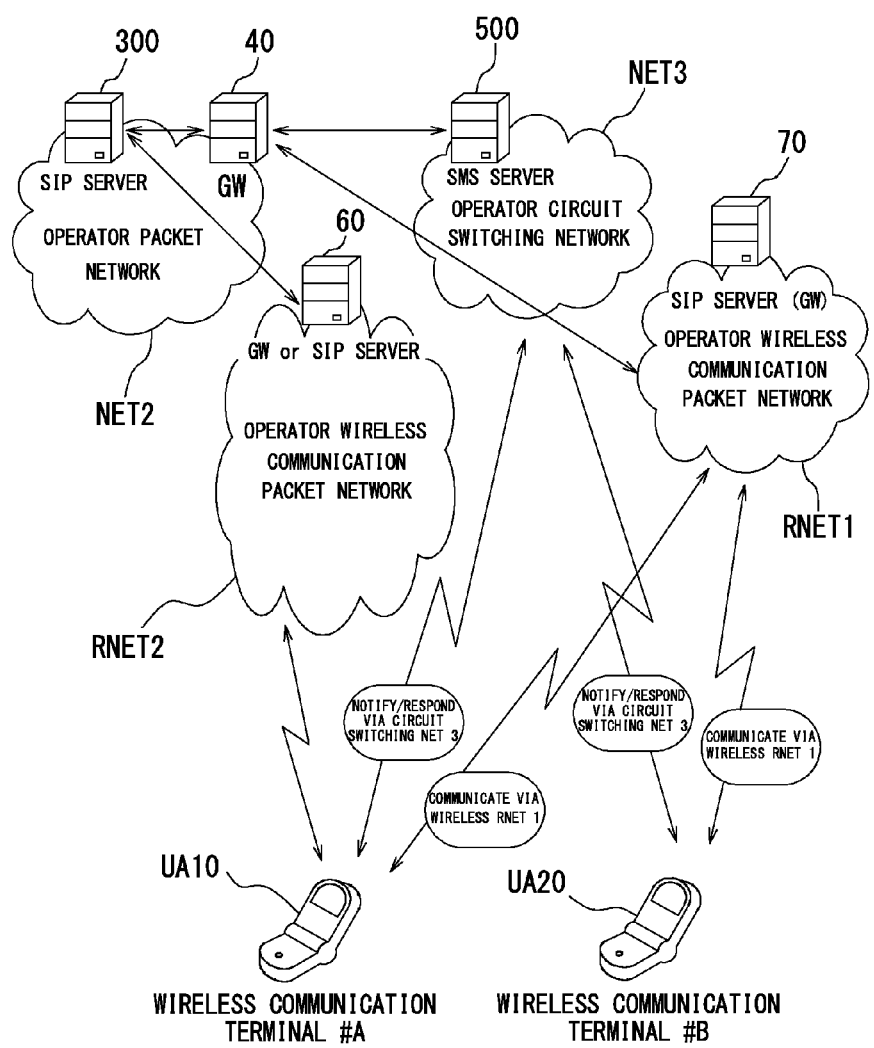
FIG. 1 is a configuration diagram of a wireless communication network in accordance with an embodiment of the present invention.

Before detailed description of the principle and the constitution of the present invention, a typical processing sequence of the present invention is briefly described. Although the present invention is intended for a variety of types of wireless communication apparatuses and control methods thereof, wireless communication terminals representative for the wireless communication apparatus are exemplified herebelow.

(1) In order to call from the wireless communication terminal (apparatus) having a plurality of wireless communication network systems (devices) to another wireless communication terminal (apparatus) with a realtime application, the wireless communication terminal of a calling side notifies the wireless communication terminal of a called side of the name of the wireless communication network to which the calling side is connectable and a required bandwidth of the desired realtime application. The wireless communication terminal of the called side selects a wireless communication network for the called side, in consideration of the wireless communication networks to which each of itself and the calling side are connectable and the required bandwidth of the application, and notifies the wireless communication terminal of the calling side of the name of the wireless communication network selected at the called side and names of the wireless communication networks to which the called side is connectable as a response to the calling side. Then, the wireless communication terminal of the calling side selects a wireless communication network based on the notification from the called side and performs necessary SIP procedures on the selected wireless communication network to start a session.

(2) The wireless communication terminals of both the calling side and the called side are connectable to a circuit switching network and a packet switching network. The normal standby operation of the called side is performed on the circuit switching network, and the communication device connecting to a plurality of packet switching networks is set to a dormant mode, so as to prevent waste of battery consumption. Operations of the calling side are also carried out on the circuit switching network and the communication device thereof connecting to the plurality of packet switching networks is set to the dormant mode until receiving a notification from the called side. It may thus prevent unnecessary operations such as to start up the communication device of the wireless communication network still unclear whether to be used, or to select an optimum wireless communication network and perform handover after the session has been started.

(3) The wireless communication network to which the wireless communication terminal of the calling side is connectable and the bandwidth required for the desired realtime application in the above process (1) are described in an SMS (Short Message Service) to notify.

(4) The wireless communication network that the called side has selected and wireless communication networks that the called side is connectable to in the above process (1) are described in the SMS responding to the calling side to notify.

(5) When the wireless communication terminal of the called side, to which the wireless communication network to which the calling side is connectable and the required bandwidth have been notified in the above process (3), has a plurality of wireless communication networks satisfying the bandwidth condition, the wireless communication network with the lowest communication charge is selected.

(6) When the bandwidth of the wireless communication network of the called side selected in the above process (4) does not satisfy the required bandwidth, the wireless communication terminal of the calling side requires a user either to change to the application requiring a narrowband or to cancel the call to the wireless communication terminal of the called side. No process thereafter is performed and the call is terminated when cancellation of the call is selected. On the other hand, when the change of the application is selected, the wireless communication terminal of the calling side changes the application to other application usable with the notified bandwidth of the wireless communication network of the called side and performs the necessary SIP procedures on the selected wireless communication network.

(7) In the above process (1) the wireless communication terminal of the calling side notifies the called side of a policy regarding selection of the wireless communication network at the called side by prioritizing the bandwidth which the calling side wishes the called side to achieve or low communication charge, as well as the name of the wireless communication network to which the calling side is connectable and the bandwidth required for the reattime application the calling side desires to use. The wireless communication terminal of the called side selects a wireless communication network for the called side to be used based on the notified policy regarding the selection of the wireless communication network.

Preferred embodiments of the present invention will now be described with reference to the accompanying drawings. Shown in FIG. 1 is a configuration diagram of the wireless communication network in accordance with an embodiment of the present invention. As shown in the figure, serving as a server or a gateway are a SIP server 300, a gateway (GW) 40, an SMS server 500, a SIP server (or GW) 60, and a SIP server (or GW) 70. The SIP server 300 functions as a call control server, while the SMS server 500 functions as a message transmitting server. A wireless communication terminal UIA (User Agent) 10 (a wireless communication terminal #A) and a wireless communication terminal UA20 (a wireless communication terminal #B) serve as a communication terminal of a calling side and a communication terminal of a called side, respectively. Each of these wireless communication terminals is connected to each server and gateway described above via an operator packet network NET2, an operator circuit switching network NET3, and operator wireless communication packet networks RNET1 and RNET2. Each terminal (apparatus) is capable of using a plurality of different wireless communication systems (networks). It is to be noted that a "system" may be referred to as a "network" hereinafter.

The wireless communication terminals UA10 and UA20 are set to standby modes on the operator circuit switching network NET3 and capable of transmitting and receiving a message. When set to the standby modes on the circuit switching network, both of the wireless communication terminals UA1 and UA2 are not connected to packet switching networks of the operator wireless communication packet networks RNET1 and RNET2 and in the dormant mode. The operator wireless communication packet network RNET2 is a network with a broader bandwidth than that of the operator wireless communication packet network RNET1. The wireless communication terminal UA20 is a so-called multimode terminal connectable to a plurality of wireless communication networks. For simplification sake, here it is assumed that both wireless communication terminals UA10 and UA20 are connectable to the operator wireless communication packet networks RNET1 and RNET2. However, when the wireless communication terminals UA10 and UA20 are in the standby mode on the circuit switching network corresponding to the operator wireless communication packet network RNET1, they are unconnected to the packet switching networks of the operator wireless communication networks RNET1 and RNET2 and in the unconnected state.

Figure 2:
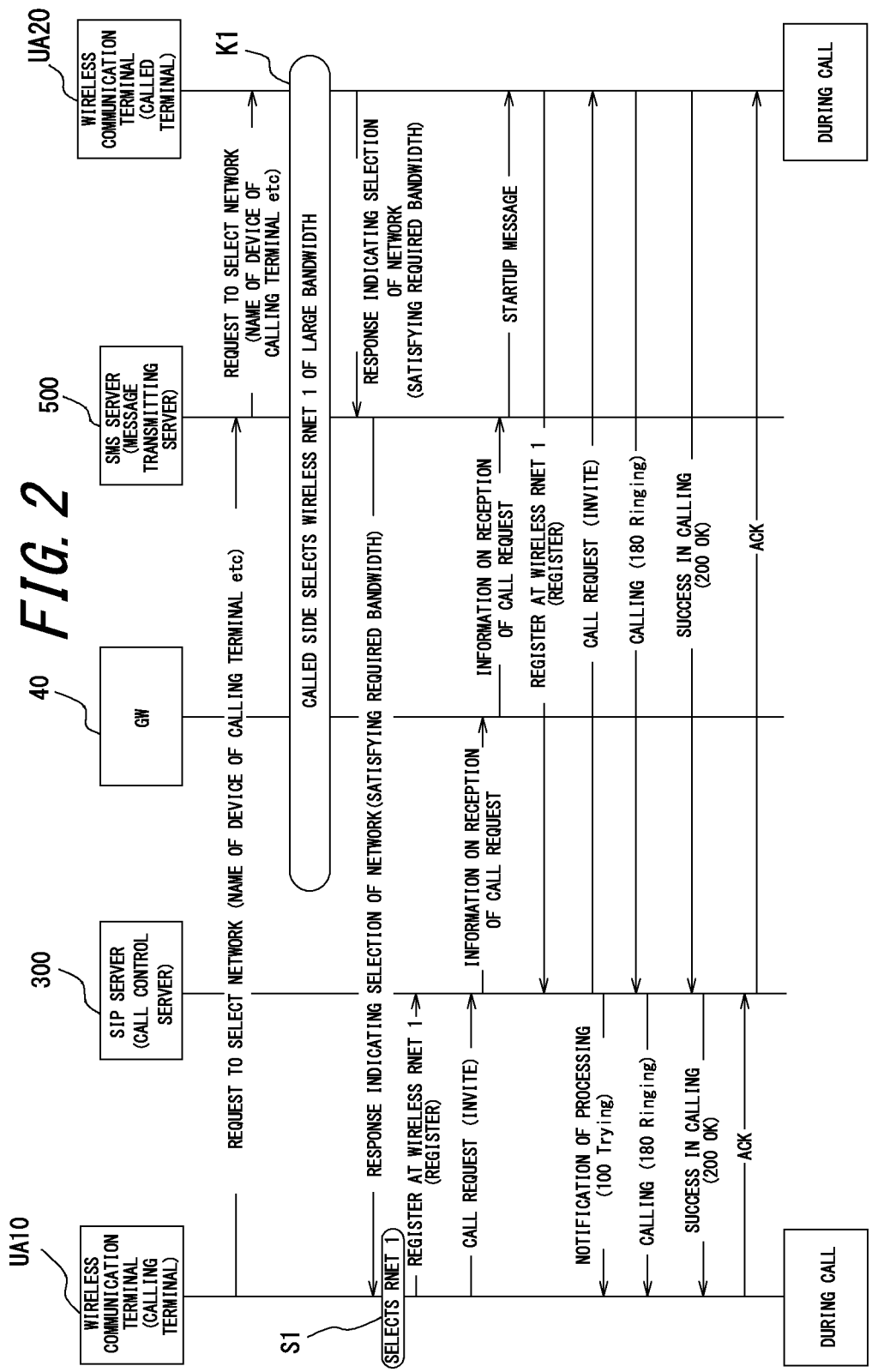
FIG. 2 is a sequence diagram illustrating communication between wireless communication terminals having the same operator (wireless carrier)

Shown in each of the FIGS. 2, 3, 4 and 5 is a sequence diagram illustrating communication between wireless communication terminals having the same operator (wireless carrier). Shown in FIG. 2 is a sequence of a case in which the called side satisfies a condition (selection request) desired by the calling side. When initially calling the wireless communication terminal UA20, the wireless communication terminal UA10 transmits an inquiry message (selection request) regarding the wireless communication network to be used via the SMS server 500 serving as a relay station, prior to transmitting the call establishing message. Described in the inquiry message (request) are:

a type of the desired realtime application;
a name of the wireless communication network to which the wireless communication terminal UA10 is connectable;
the bandwidth required for the desired realtime application; and
a preference/policy of the calling side regarding priority on the bandwidth or the low communication charge (FIG. 6).

The inquiry message is transmitted from the wireless communication terminal UA10 to the wireless communication terminal UA20 by SMS of the circuit switching network NET3.

Figure 8:
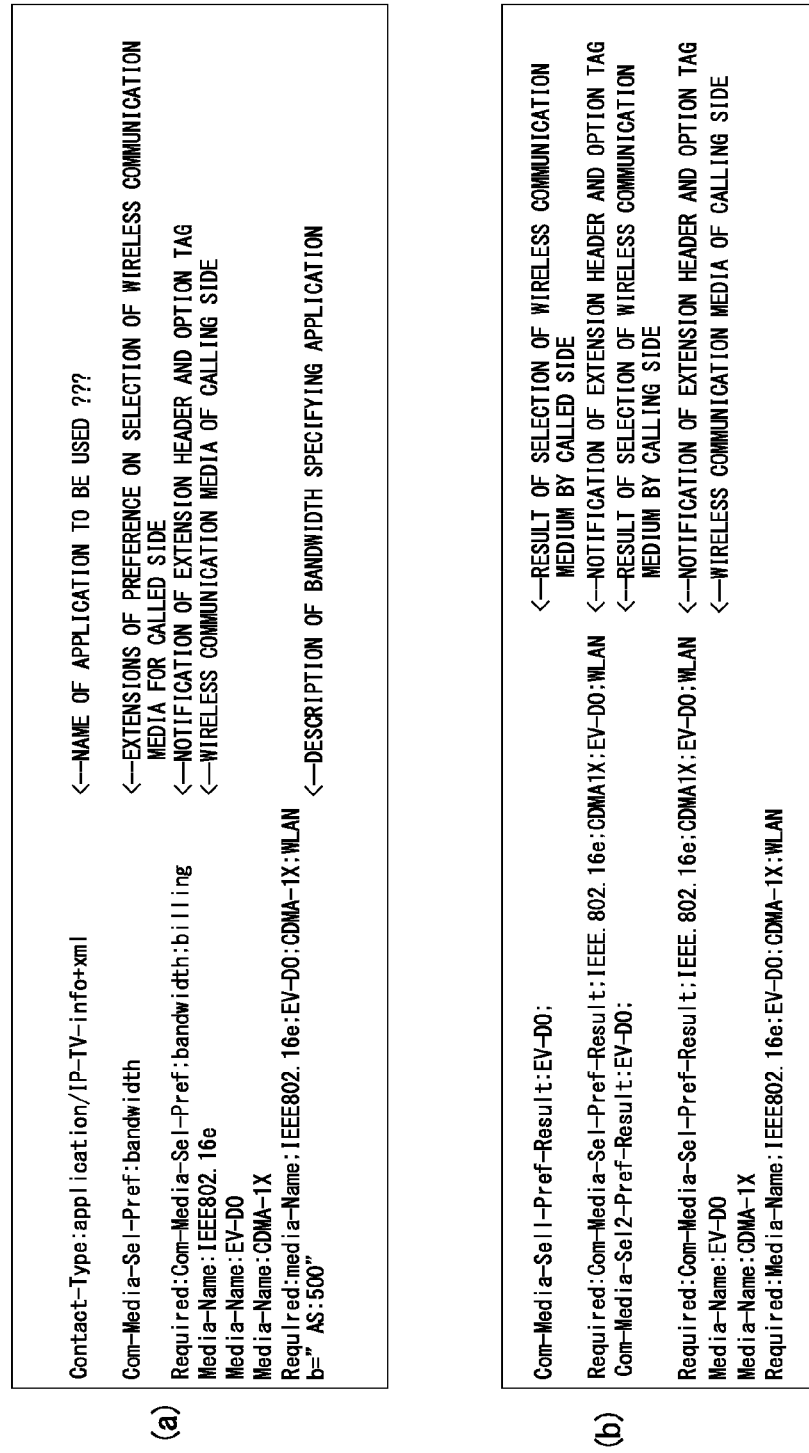
FIG. 8 shows still other exemplary formats of the inquiry message and the response message supported by communication apparatuses such as the wireless communication terminals and the SIP servers in accordance with the present invention.

Shown in the FIGS. 6, 7 and 8 are examples of formats of the inquiry message and the response message supported by the communication apparatus such as the wireless communication terminals and the SIP server in accordance with the present invention. In these figures, (a) shows the format of the inquiry message and (b) shows the response message to the inquiry message.

Shown in FIG. 6 are messages in the sequence shown in FIG. 2. As shown in the (a) of FIG. 6, the wireless communication terminal UA10 transmits the inquiry message (request) containing:

the type of the desired realtime application is IPTV;
the wireless communication terminal UA10 is connectable to 1EEE208.16e, EVDO, and CDMA-1X;
a required bandwidth is 500 kbps (AS:500); and
the priority is given to the bandwidth (preference: bandwidth).

On receiving the selection request of the wireless communication network, the wireless communication terminal UA20 selects a wireless communication network to use for a communication session with the wireless communication terminal UA10, in consideration of the name of the wireless communication network to which the wireless communication terminal UA10 is connectable, the required bandwidth for the desired realtime application, and the desired condition (preference/policy) regarding the priority either on the bandwidth or on the low communication charge, which are described in the selection request, and the wireless communication network to which the wireless communication terminal UA20, the called terminal, is connectable. The wireless communication terminal UA20 then transmits a response message containing, as shown in (b) of FIG. 6, the name of the wireless communication network which the wireless communication terminal UA20 selects as a called terminal and the name of the wireless communication network to which the wireless communication terminal UA20 is connectable, to the wireless communication terminal UA10 by SMS of the circuit switching network.

As shown in (b) of FIG. 6, the wireless communication terminal UA20 transmits the response message containing:

the selected wireless communication network of the wireless communication terminal UA20 is EV-DO (a wireless communication network 1); and the wireless communication terminal UA20 is connectable to EVDO and CDMA-1X.

Introduction of such formats of the inquiry message and the response message enables transmission of the condition (preference information) desired by the calling side to the called side thus it is possible for the calling side to know the response condition of the called side prior to initiation of the session. Therefore, the calling side can perform a control operation corresponding to the wireless communication system (including the bandwidth information) selected by the called side.

Now back to the description of FIG. 2, the wireless communication terminal UA10 receives the SMS notifying that the called side selects the RNET1 satisfying the required bandwidth (Step K1). When receiving the notification notifying the desired selection request is satisfied, the wireless communication terminal UA10 as the calling terminal decides to use the application corresponding to the desired 500K bandwidth as planned at first, automatically selects the wireless communication network RNET1 (Step S1) and performs SIP connection request (REGISTER) to the SIP server 300. Then the session (communication) between the wireless communication terminals UA10 and UA20 is established by procedures of SIP, so that the users of both terminals may start communication. Specifically, the wireless communication terminal UA10 next transmits INVITE, the call establishing message to the wireless communication terminal UA20, to the SIP server 300. When receiving INVITE, the SIP server 300 transmits the call request information for the wireless communication terminal UA20 to the SMS server 500, which then transmits a startup message to the wireless communication terminal UA20. When receiving the startup message, the wireless communication terminal UA20 connects to the selected wireless communication network RNET1, and registers at the SIP server 300. Although the wireless communication network selected by the called side satisfies the bandwidth requested by the calling side in the FIGS. 2 and 4, another case where the wireless communication network selected by the called side does not satisfy the bandwidth requested by the calling side are shown in the FIGS. 3 and 7.

Figure 3:
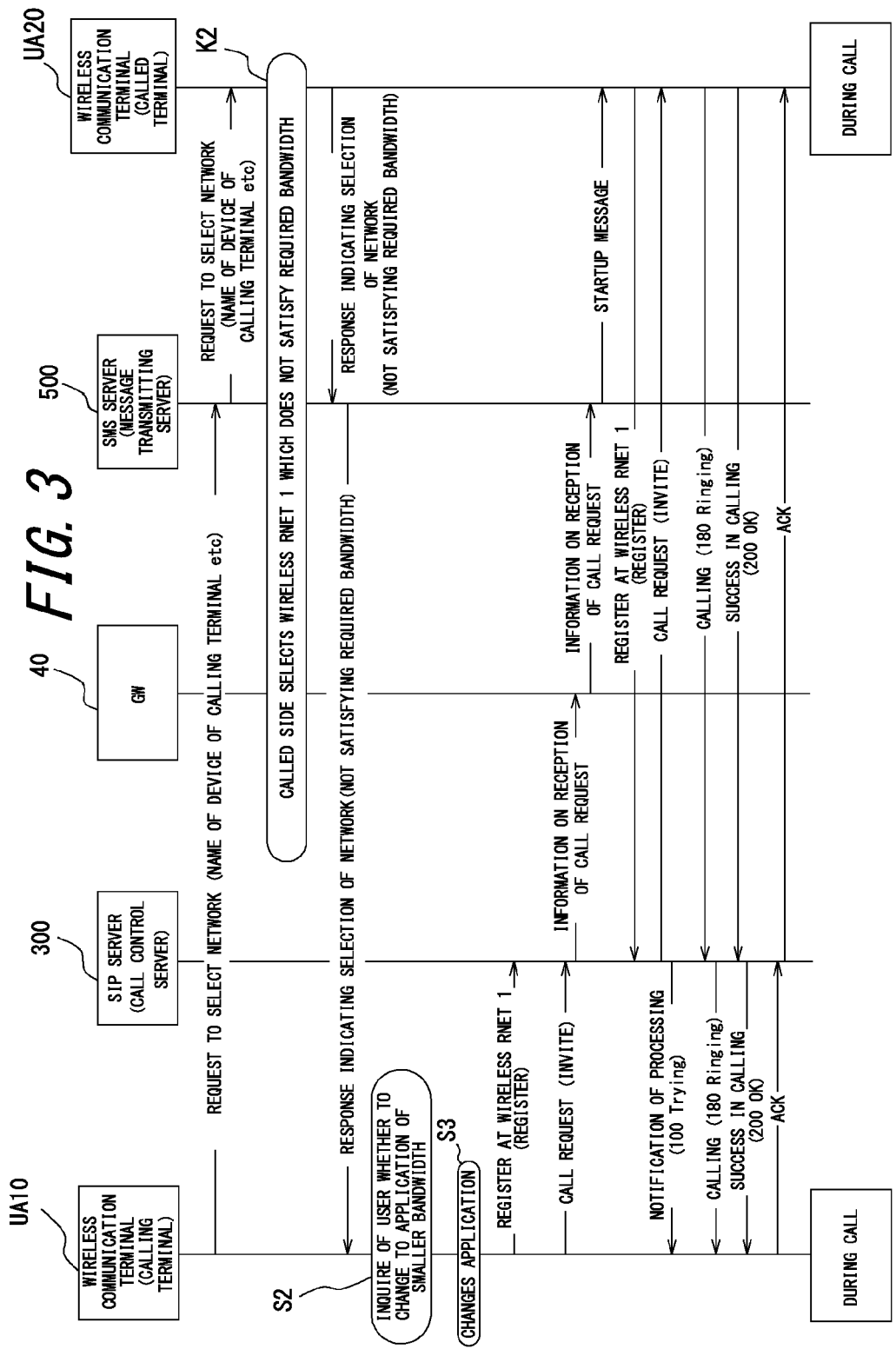
FIG. 3 is another sequence diagram illustrating communication between the wireless communication terminals having the same operator (wireless carrier)

Shown in FIG. 3 is a sequence diagram in a case in which the called side does not satisfy the condition (selection request) desired by the calling side. Although selected as the wireless communication system is the wireless communication network RNET1 using EVDO satisfying the desired condition suggested by the calling side, a message is transmitted (Step K2) to inform that only 500 kbps bandwidth can be secured and the 5000 kbps bandwidth (AS: 5000) of the required condition cannot be satisfied because of poor receiving condition of the wireless communication terminal UA20 at the called side.

When receiving the response message, the wireless communication terminal UA10 requires the user to select either to change the realtime application to other application requiring narrowband or to cancel the call to the wireless communication terminal UA20 at a step S2, because of incapability of using the desired realtime application in the selected wireless communication network. The user approves change of the application at a step S3. The change of the application to the one requiring narrow band includes in addition to change of application itself (from a videophone call to a voice-only call), for example, change to a codec suitable for a low bit rate, change of image quality of the videophone from high quality to low quality, change from a colored image to a black and white image, and change of parameters of the application. When cancellation of the call to the wireless communication terminal UA20 is selected in the Step S3, the call is cancelled and the procedure is terminated. Procedures thereafter are the same as those shown in FIG. 2.

As described above, since the calling side initially notifies the called side of the wireless communication network to which the calling side is connectable and the required bandwidth on the circuit switching network, it may prevent the calling side from starting up and registering the wireless communication network device which is unclear whether optimum in advance and from switching from the wireless communication network registered in advance to the optimum wireless communication network.

Figure 4:
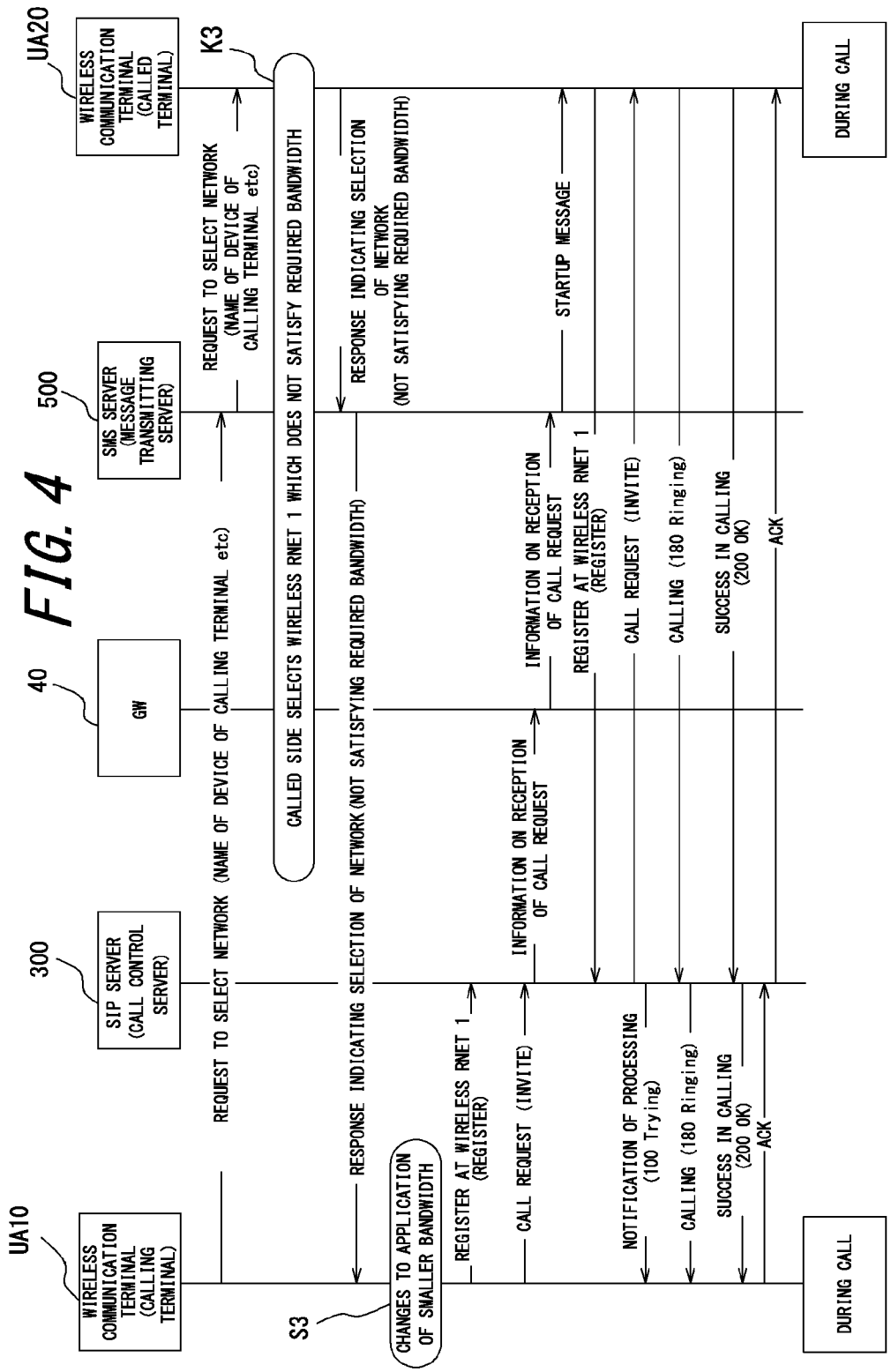
FIG. 4 is still another sequence diagram illustrating communication between the wireless communication terminals having the same operator (wireless carrier)

Shown in FIG. 4 is a sequence diagram of a case in which the called side does not satisfy the condition (selection request) desired by the calling side. FIG. 7 shows messages in the sequence in FIG. 4. The steps before the Step K3 are the same as those in FIG. 3. Although selected as the wireless communication system is the wireless communication network RNET1 using EVDO satisfying the condition desired by the calling side, a message is transmitted (Step K3) to inform that only 500 kbps bandwidth can be secured and the required 5000 kbps bandwidth (AS:5000) cannot be satisfied because of poor receiving condition of the wireless communication terminal UA20 at the called side.

When receiving the response message, as with usable bandwidth (500 kbps as shown in (b) of FIG. 7) of the called side, it is not possible to use the wireless communication network realtime application (requiring 5000 kbps as shown in (a) of FIG. 7) desired by the calling side, the wireless communication terminal UA10 automatically changes the application to other application with narrower required bandwidth without inquiring the user (Step S3). The procedures thereafter are the same as those shown in FIG. 2. In this case, since the calling side automatically changes the realtime application to the application of narrower bandwidth based on the condition selected by the called side, it may enable quick initiation of communication. It is to be noted that the wireless communication network can also be automatically changed to the one with narrower bandwidth and SIP can be initiated, if it is usable for the calling side.

Shown in FIG. 5 as an example of variations of the case in FIG. 2 is a sequence diagram of a case in which the called side satisfies the condition (selection request) desired by the calling side. FIG. 8 shows the messages in the sequence shown in FIG. 5. The wireless communication terminal UA20 selects the wireless communication network RNET1 of broadband for both the calling side and the called side in the Step K4. As shown in (b) of FIG. 8, the wireless communication terminal UA20 transmits the response containing:

the selected wireless communication network of the wireless communication terminal UA20 is EV-DO (the wireless communication network 1);

the selected wireless communication network of the wireless communication terminal UA10 is EV-DO (the wireless communication network 1); and the wireless communication terminal UA20 is connectable to EVDO and CDMA-1X.

Namely, the wireless communication terminal UA20 of the called side determines and notifies that EV-DO is the wireless communication network the wireless communication terminal UA10 of the calling side should select.

In such a case, the wireless communication terminal UA10 which received the response message does not control to select the wireless communication network by itself like the step S1 in FIG. 2 but requests connection of SIP communication using the wireless communication network RNET1 following the result of selection in the response message. Procedures thereafter are the same as those shown in FIG. 2.

Shown in Table 1 are combinations of inquiry messages and response messages corresponding thereto. Cases in which conditions are satisfied are shown as Inquiry Messages 1 to 3 and Response Messages 1 to 3 in the upper half of the table, while other cases in which conditions are not satisfied are shown as Inquiry Messages 4 to 6 and Response Messages 4 to 6 in the lower half. As shown in the table, both the calling side and the called side are capable of mutually recognizing the desired condition and the result of selection by the corresponding party whether it is designation of the bandwidth or the system name, or even the combination thereof with no trouble.

TABLE 1

|  |  | Designation of Bandwidth | Designation of System Name | Combination of Bandwidth and System |
|---|---|---|---|---|
| When Satisfying The Condition | Inquiry Message 1 | 500K |  |  |
|  | Response Message 1 | 500K |  |  |
|  | Inquiry Message 2 |  | EVDO, WiMAX |  |
|  | Response Message 2 |  | EVDO |  |
|  | Inquiry Message 3 |  |  | EVDO, 500K |
|  | Response Message 3 |  |  | 500K |
| When Not Satisfying The Condition | Inquiry Message 4 | 5000K |  |  |
|  | Response Message 4 | 500K |  |  |
|  | Inquiry Message 5 |  | WiMAX |  |
|  | Response Message 5 |  | EVDO |  |
|  | Inquiry Message 6 |  |  | WiMAX, 5000K |
|  | Response Message 6 |  |  | 500K |

Storing a table as shown in Table 2, for example, in memory units of the wireless communication terminals of both the calling side and the called side enables transmission of the message informing that the wireless communication system 1 is desired, only by inserting one of EVDO as the wireless communication standard, 500 kbps as the bandwidth and "ABC" of cards produced by A company as the wireless communication device into the message.

TABLE 2

|  | Wireless Communication Standard | Bandwidth | Wireless Communication Device |
|---|---|---|---|
| Wireless Communication System 1 | EVDO | 500 kbps | ABC Card Produced by A company |
| Wireless Communication System 2 | CDMA-1X | 200 kbps | xxx Card Produced by B Company |
| Wireless Communication System 3 | IEEE802.16e | 10 Mbps | yyy Card Produced by C Company zzz Card Produced by D Company |

Figure 9:
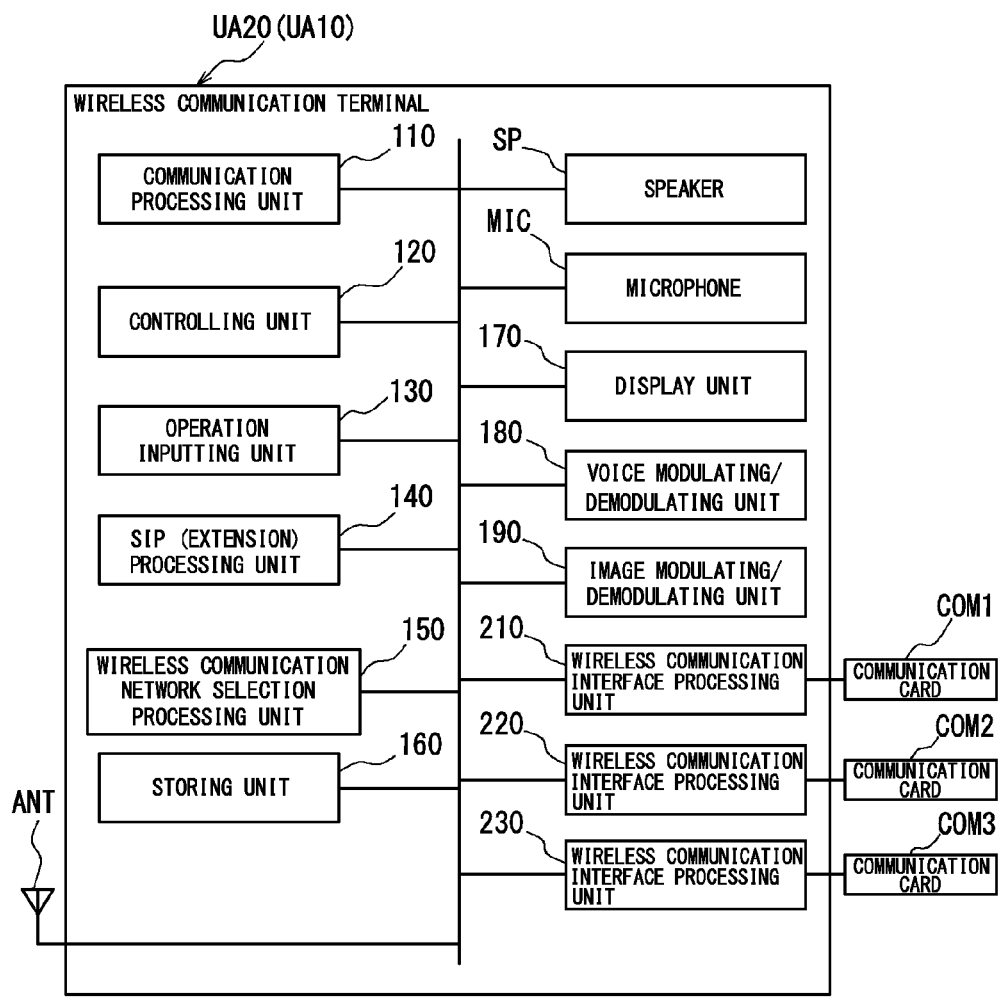
FIG. 9 is a functional block diagram of the wireless communication terminal.

Shown in FIG. 9 is a functional block diagram of the wireless communication terminal. As shown in the figure, the wireless communication terminal UA20 (or UA10) is provided with a communication processing unit 110, a control unit (CPU, processor) 120, an operation (preference) inputting unit 130, a SIP (an extension) processing unit 140, a wireless communication network selection processing unit 150, a storing unit 160, a speaker SP, a microphone MIC, a display unit 170, a voice modulating/demodulating unit 180 and an image modulating/demodulating unit 190. The wireless communication terminal UA20 is further provided with three wireless communication interface processing units 210, 220 and 230, and an antenna ANT. Communication cards COM1, COM2 and COM3 for connecting to different kinds of wireless communication networks are mounted in the wireless communication interface processing units 210, 220 and 230, respectively. The communication processing unit 110 serves as a transmitting unit and a receiving unit to transmit and receive the call establishing message (INVITE message), as well as to transmit and receive the inquiry message (SMS message) with the packet switching network, via the wireless communication network selection processing unit 150, one of the wireless interface processing units 210, 220 and 230, and one of the communication cards COM1, COM2 and COM3.

Figure 10:
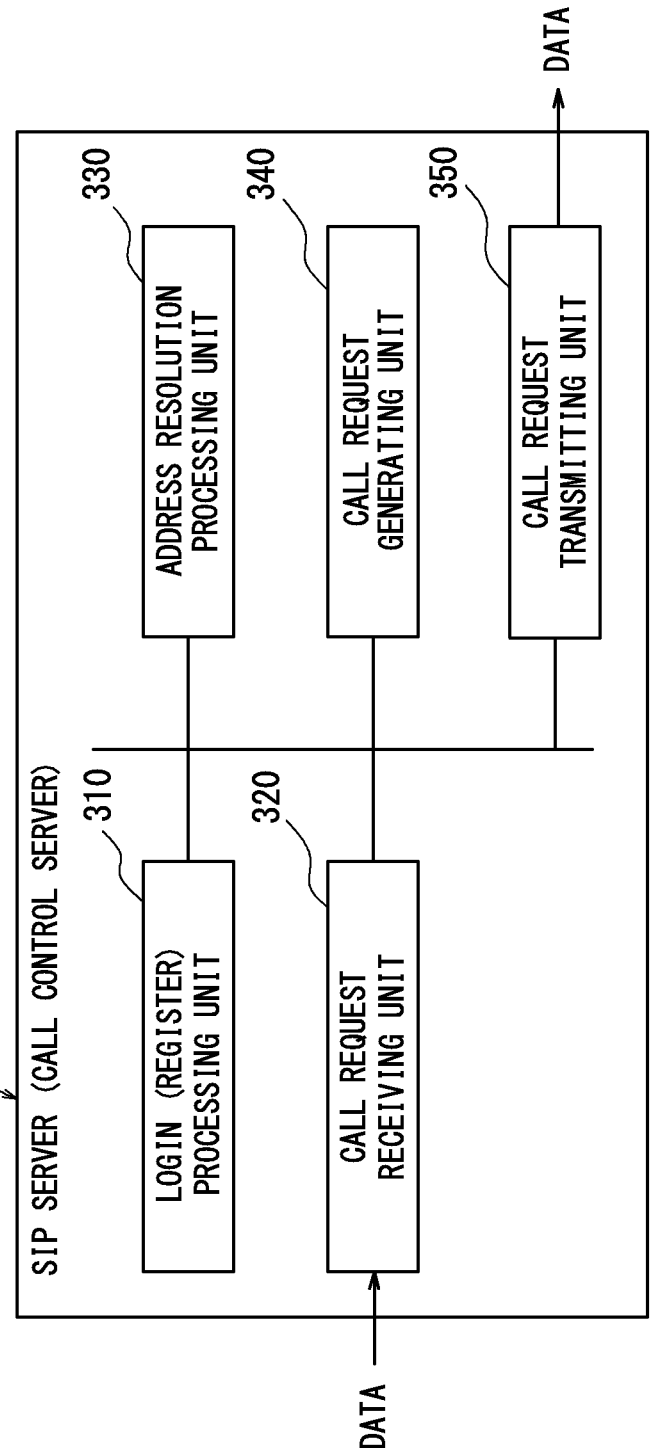
FIG. 10 is a functional block diagram of the SIP server (a call control server)

Shown in FIG. 10 is a functional block diagram of the SIP server (call control server). As shown in the figure, the SIP server 300 is provided with a login (register) processing unit 310, a call request receiving unit 320, an address resolution processing unit 330, a call request generating unit 340, and a call request transmitting unit 350. The login (register) processing unit 310 receives a login (register) request from the terminal and carries out necessary processing. The call request receiving unit 320 receives the call establishing message (Invite message) including the preference information of the calling side for calling the called side. In order to transmit the call establishing message received by the call request receiving unit 320 to the called side, the call request generating unit 340 generates call request information (Info message) including information indicating reception of the call establishing message and the desired condition (preference information) included in the call establishing message. The call request transmitting unit 350 transmits the generated call request information (Info message) to the SMS server (message transmitting server).

Figure 11:
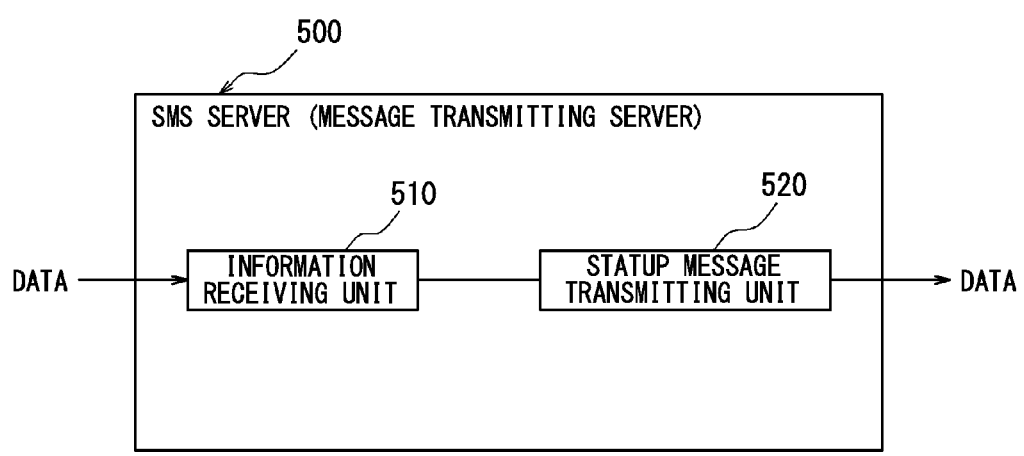
FIG. 11 is a functional block diagram of an SMS server (a message transmitting server)
Figure 12:
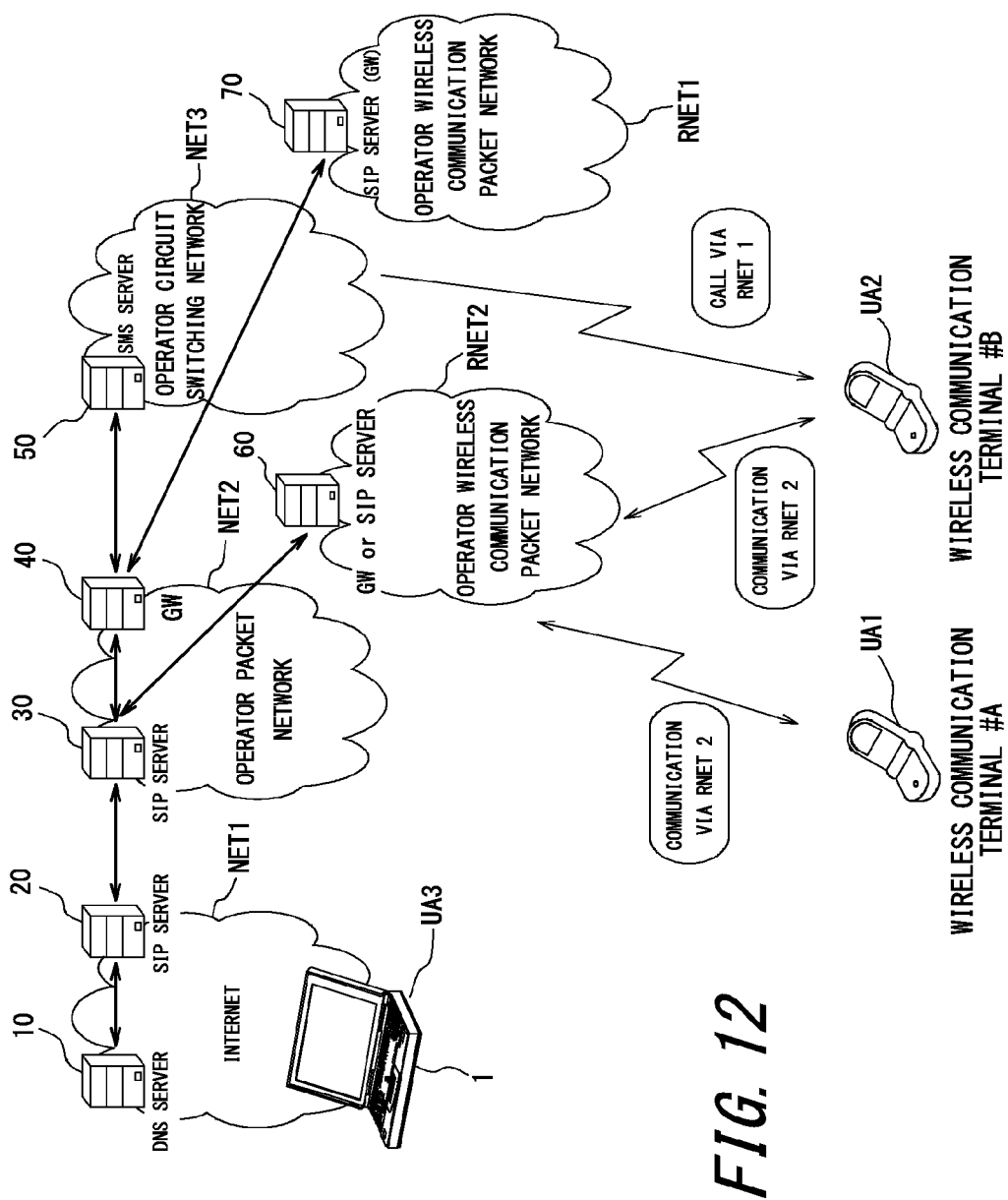
FIG. 12 is a configuration diagram illustrating a wireless communication network in accordance with the conventional art.

Shown in FIG. 11 is a functional block diagram of the SMS server (message transmitting server). As shown in the figure, the SMS server 500 is provided with an information receiving unit 510 and a startup message transmitting unit 520. The information receiving unit 510 receives the call request information transmitted from the SIP server (call control server). The startup message transmitting unit 520 inserts the preference information included in the call request information into the startup message (SMS message) to startup communication with the calling side based on the call request information received by the information receiving unit 510, and then transmits the startup message to the called side.

While the invention has been described with reference to exemplary embodiments and drawings, it will be understood by those skilled in the art that many various variations and modifications of the above-described technology may be implemented using the teaching of this invention. All such variations and modifications are intended to be included within the true spirit and scope of the present invention. For example, each member, each means, each step and the like can be rearranged not to be contradictory logically.

The invention claimed is:

1. A wireless communication apparatus capable of using a plurality of different wireless communication systems comprising:
   a receiving unit for receiving an inquiry message prior to receiving a call establishing message, via a circuit switching network, inquiring whether possible to respond to the call establishing message to be transmitted later from a calling side by selecting a wireless communication system satisfying a condition desired by the calling side;
   a transmitting unit for determining whether possible to respond to the call establishing message by selecting a wireless communication system satisfying the condition among the plurality of wireless communication systems based on the inquiry message received and for transmitting a response message indicating a result of the determination to the calling side, via the circuit switching network; and
   a control unit for controlling to respond to the call establishing message transmitted later from the calling side by selecting a wireless communication system based on the result of the determination.

2. The wireless communication apparatus according to claim 1, wherein the transmitting unit transmits a respondable condition to the calling side as the result of the determination to the call establishing message to be transmitted later from the calling side when a wireless communication system satisfying the condition cannot be selected.

3. The wireless communication apparatus according to claim 2, wherein the respondable condition is information indicating a wireless communication system to be selected for its own terminal to respond to the call establishing message to be transmitted later from the calling side.

4. A wireless communication apparatus capable of using a plurality of different wireless communication systems comprising:

a first transmitting unit for transmitting a call establishing message to a called side;

a second transmitting unit for transmitting an inquiry message prior to transmission of the call establishing message, via a circuit switching network, inquiring whether possible to respond to the call establishing message by selecting a wireless communication system satisfying a condition desired by its own apparatus to the called side when the called side responds to the call establishing message, prior to transmission of the call establishing message by the first transmitting unit;

a receiving unit for receiving a response message, from the called side via the circuit switching network, indicating whether possible to respond to the call establishing message by selecting a wireless communication system satisfying the condition based on the inquiry message transmitted from the second transmitting unit; and a control unit for controlling the first transmitting unit to select one wireless communication system among the plurality of wireless communication systems based on the response message received and to transmit the call establishing message to the called side.

5. The wireless communication apparatus according to claim 4, wherein when a response message indicating that it is possible to respond by connecting to a wireless communication system satisfying the condition is received from the called side, the control unit controls the first transmitting unit to select one wireless communication system satisfying the desired condition among the plurality of wireless communication systems and to transmit the call establishing message to the called side.

6. The wireless communication apparatus according to claim 4, wherein when a response message indicating that it is possible to respond by connecting to a wireless communication system not satisfying the condition is received from the called side, the control unit controls the first transmitting unit to select one wireless communication system among the plurality of wireless communication systems based on the response message and to transmit the call establishing message to the called side.

7. A control method of a wireless communication apparatus capable of using a plurality of different wireless communication systems, the method comprising the steps of:

receiving an inquiry message prior to receiving a call establishing message, via a circuit switching network, inquiring whether possible to respond to the call establishing message to be transmitted later from a calling side by selecting a wireless communication system satisfying a condition desired by the calling side;

determining whether possible to respond to the call establishing message by selecting a wireless communication system satisfying the condition among the plurality of wireless communication systems based on the inquiry message received and transmitting a response message indicating a result of the determination to the calling side, via the circuit switching network; and controlling to respond to the call establishing message transmitted later from the calling side by selecting a wireless communication system based on the result of the determination.

8. A control method of a wireless communication apparatus capable of using a plurality of different wireless communication systems, the method comprising the steps of:

transmitting an inquiry message prior to transmitting a call establishing message, via a circuit switching network, inquiring whether possible to respond to the call establishing message by selecting a wireless communication system satisfying a condition desired by a calling side to a called side when the called side responds to the call establishing message, prior to transmission of the call establishing message to the called side;

receiving a response message, from the called side via the circuit switching network, indicating whether possible to respond to the call establishing message by selecting a wireless communication system satisfying the condition based on the inquiry message transmitted; and controlling to transmit the call establishing message to the called side by selecting one wireless communication system among the plurality of wireless communication systems based on the response message received.

9. A control method of wireless communication apparatuses of a calling side and a called side capable of using a plurality of different wireless communication systems, the method comprising:

a first transmitting step for the wireless communication apparatus of the calling side to transmit an inquiry message, via a circuit switching network, inquiring whether possible to respond to a call establishing message by selecting a wireless communication system satisfying a condition desired by the calling side to the called side when the called side responds to the call establishing message, prior to transmission of the call establishing message to the called side;

a first receiving step for the wireless communication apparatus of the called side to receive the inquiry message prior to receiving the call establishing message from the wireless communication apparatus of the calling side;

a second transmitting step for the wireless communication apparatus of the called side to determine whether possible to respond to the call establishing message by selecting a wireless communication system satisfying the condition among the plurality of wireless communication systems based on the inquiry message received, and to transmit a response message indicating a result of the determination to the calling side via the circuit switching network;

a second receiving step for the wireless communication apparatus of the calling side to receive the response message transmitted in the second transmitting step from the called side;

a first control step for the wireless communication apparatus of the calling side to control to select one wireless communication system among the plurality of wireless communication systems based on the response message received and to transmit the call establishing message to the called side; and a second control step for the wireless communication apparatus of the called side to control to respond to the call establishing message transmitted from the calling side by selecting a wireless communication system based on the result of the determination.

* * * * *